(12) United States Patent
Schnieders

(10) Patent No.: US 12,395,444 B2
(45) Date of Patent: Aug. 19, 2025

(54) LOW-JITTER COMMUNICATION CONNECTION FOR A DISTRIBUTED REAL-TIME APPLICATION

(71) Applicant: Deutsche Telekom AG, Bonn (DE)

(72) Inventor: Dominik Schnieders, Aachen (DE)

(73) Assignee: DEUTSCHE TELEKOM AG, Bonn (DE)

(*) Notice: Subject to any disclaimer, the term of this patent is extended or adjusted under 35 U.S.C. 154(b) by 3 days.

(21) Appl. No.: 18/391,700

(22) Filed: Dec. 21, 2023

(65) Prior Publication Data
US 2024/0214320 A1 Jun. 27, 2024

(30) Foreign Application Priority Data
Dec. 27, 2022 (EP) .................................. 22216814

(51) Int. Cl.
*H04L 47/25* (2022.01)
(52) U.S. Cl.
CPC .................... *H04L 47/25* (2013.01)
(58) Field of Classification Search
CPC ...... H04L 47/25; H04L 47/22; H04L 47/2416
See application file for complete search history.

(56) References Cited

U.S. PATENT DOCUMENTS

| | | | |
|---|---|---|---|
| 11,394,620 B1* | 7/2022 | Brailovskiy | H04L 41/147 |
| 11,616,730 B1* | 3/2023 | Schapira | H04L 47/26 370/235 |
| 2011/0283012 A1* | 11/2011 | Melnyk | H04N 21/234381 709/231 |
| 2012/0092991 A1* | 4/2012 | Jeong | H04L 67/04 370/235 |
| 2014/0105026 A1* | 4/2014 | Wanstedt | H04L 47/29 370/236 |
| 2020/0351180 A1* | 11/2020 | Hållmarker | H04L 43/0894 |
| 2024/0380808 A1* | 11/2024 | Gao | H04L 65/80 |

* cited by examiner

*Primary Examiner* — Caroline H Jahnige
(74) *Attorney, Agent, or Firm* — Leydig, Voit & Mayer, Ltd.

(57) ABSTRACT

A method for operating a communication network provides a sender of a distributed real-time application and a receiver of the distributed real-time application with a communication connection. The sender periodically transmits data packets to the receiver via the provided communication connection at a data rate exploiting a currently available bitrate of the communication connection. A node of the communication network anticipates the currently available bitrate to discontinuously drop and signals a difference of a dropped bitrate from the currently available bitrate to the distributed real-time application. The distributed real-time application immediately reduces the data rate according to the signalled difference.

14 Claims, 1 Drawing Sheet

LOW-JITTER COMMUNICATION CONNECTION FOR A DISTRIBUTED REAL-TIME APPLICATION

CROSS REFERENCE TO RELATED APPLICATIONS

This application claims benefit to European Patent Application No. EP 22 216 814.8, filed on Dec. 27, 2022, which is hereby incorporated by reference herein.

FIELD

The invention relates to a method for operating a communication network, wherein a communication network provides a sender of a distributed real-time application and a receiver of the distributed real-time application with a communication connection and the sender periodically transmits data packets to the receiver via the provided communication connection at a data rate exploiting a currently available bitrate of the communication connection. The invention further relates to computer program products.

BACKGROUND

The distributed real-time application may also be referred to as a near-real-time-application, a time-critical application or a latency-critical application. The distributed real-time application usually comprises an application frontend and an application backend. The application frontend and the application backend may be executed by a first computing device and a second computing device, respectively, the second computing device being different and separate from the first computing device.

The application frontend and the application backend are configured for transmitting application data via the communication network. The application data usually comprises a plurality of periodically transmitted data packets. The data packets may be transmitted by the application frontend (uplink) or by the application backend (downlink). Accordingly, each of the application frontend and the application backend may be either a sender of the distributed real-time application or a receiver of the distributed real-time application.

The first and second computing devices may be connected via the communication connection provided by the communication network. The communication network, i.e., a node of the communication network dynamically allocates network resources to the communication connection. The allocated network resources depend on a current load of the communication network and a current condition of the communication connection.

The distributed real-time application may require both a low latency and a low volatility of the latency, i.e. a low and constant latency, of the communication connection. The volatility of the latency is usually referred to as a jitter of the communication connection. The latency of the communication connection is essentially determined by a queue time of a data packet passing through a queue provided by the node of the communication network. The distributed real-time application may exploit, e.g., almost completely use a currently available bitrate of the communication connection, i.e. a link capacity, in order to prevent the queue and, as a consequence, the latency or the jitter of the communication connection from increasing.

However, the currently available bitrate may drop discontinuously. Due to inevitable round trip times, RTT, and reaction times, the sender of the distributed real-time application may be too late in adjusting the data rate to the dropped available bitrate resulting in temporarily longer passing-through times of some transmitted data packets. The temporarily longer passing-through times increase the jitter of the communication connection, the jitter impairing a proper operation of the distributed real-time application.

US 2012/0092991 A1 discloses a method for operating a mobile wireless communication device, wherein a transceiver of the mobile wireless communication device signals a changing currently available bitrate of a communication connection to an application processor of the mobile wireless communication device, the communication connection being provided by a communication network.

SUMMARY

In an embodiment, the present disclosure provides a method for operating a communication network. The communication network provides a sender of a distributed real-time application and a receiver of the distributed real-time application with a communication connection. The sender periodically transmits data packets to the receiver via the provided communication connection at a data rate exploiting a currently available bitrate of the communication connection. A node of the communication network anticipates the currently available bitrate to discontinuously drop and signal a difference of a dropped bitrate from the currently available bitrate to the distributed real-time application. The distributed real-time application immediately reduces the data rate according to the signalled difference.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
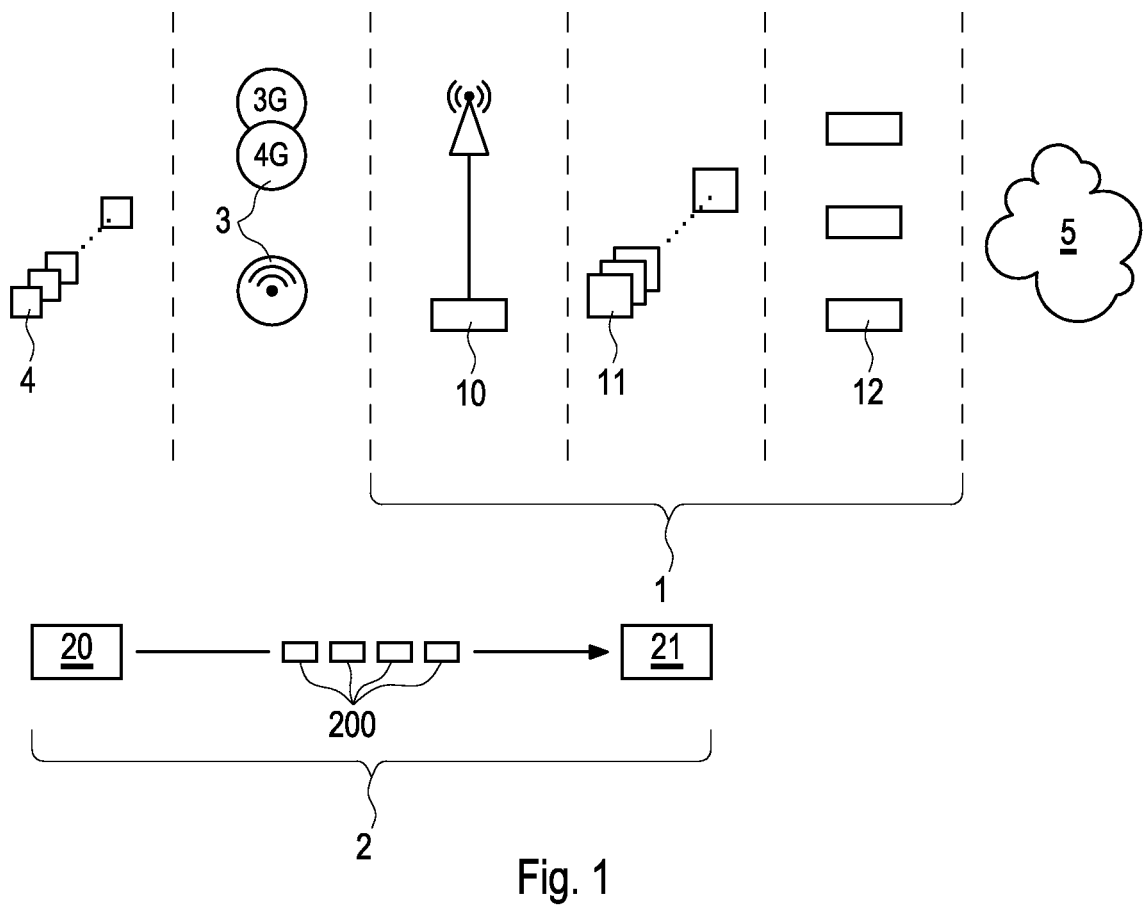
FIG. 1 schematically shows an entity diagram of a communication network being operated in a method according to an embodiment of the invention.

In accordance with an embodiment, the present invention provides a method for operating a communication network which reliably provides a distributed real-time application with a low-jitter communication connection. In some other embodiments, the invention provides computer program products.

One aspect of the invention is a method for operating a communication network, wherein a communication network provides a sender of a distributed real-time application and a receiver of the distributed real-time application with a communication connection and the sender periodically transmits data packets to the receiver via the provided communication connection at a data rate exploiting a currently available bitrate of the communication connection. The sender may transmit video frames as the data packets each video frame corresponding to a single image of the video. The video frames may comprise i-frames which comprise a complete single image of the video and p-frames which depend on a preceding i-frame or a preceding p-frame and define a single image of the video together with the preceding i-frame or the preceding p-frames.

According to the invention, a node of the communication network anticipates the currently available bitrate to discontinuously drop and signals a difference of the dropped bitrate from the currently available bitrate to the distributed real-time application and the distributed real-time application immediately reduces the data rate according to the signaled difference. Reducing the data rate may comprise reducing a frame rate and/or a resolution of video frames. The difference may be signaled to the distributed real-time application via an application programming interface, API, of the distributed real-time application.

The distributed real-time application adequately and in time reacts to the suddenly decreasing available bitrate, thus, avoiding an increasing queue time of the data packets. As a consequence, a jitter of the communication connection is reliably prevented.

Preferably, the node signals the difference when the difference exceeds a determined threshold value. The threshold value precludes small droppings of the available bitrate from being signaled. The small droppings do not substantially affect the jitter of the communication connection.

In an embodiment, the threshold value is globally predetermined independent of the distributed real-time application. The global threshold value may be a universal parameter of the communication network, particularly the node, applicable for each distributed real-time application.

Alternatively, the threshold value is individually predetermined depending on the distributed real-time application and assigned to the distributed real-time application. The individual threshold parameter may be a special parameter of the communication network, particularly the node, only applicable for the distributed real-time application. Different distributed real-time applications may be different threshold values assigned to.

The threshold value may be statically predetermined by configuring the communication network. The threshold value is a configuration parameter of the communication network, particularly the node. Configuration parameters are easy to handle.

The threshold value may be dynamically determined depending on a type of the distributed real-time application and/or an ability of the distributed real-time application in exploiting the currently available bitrate. The threshold value is a runtime parameter of the communication network, particularly the node. Runtime parameters are adaptive.

The difference is advantageously signaled as an absolute value, as an index indicating a predetermined absolute value or as a percentage of the currently available bitrate. The absolute value may be given in MBit/s. There may be discrete, e.g., equally spaced absolute values predetermined by the communication network, particularly by the node. Each predetermined absolute value may be easily addressed by an integer index (enum).

In an embodiment, exploiting the currently available bitrate comprises determining a maximum data rate compatible with the currently available bitrate and adjusting the data rate to the determined maximum data rate. In other words, the sender dynamically follows the currently available bitrate and possibly uses the currently available bitrate without exceeding it.

Preferably, determining the maximum data rate comprises repeatedly, temporarily and gradually increasing the data rate on a trial basis and letting the determined maximum data rate be a data rate where a measured latency or a volatility of the measured latency of the communication connection increases. The sender may cause an operating system to affect a transmission of internet protocol, IP, packets created from the transmitted data packets by means of a middleware in order to increase the data rate. Measuring the latency may be based on any feedback method applied by the node, e.g., low latency low loss scalable, L4S, throughput.

The node may provide a percentage of transmitted IP packets with a binary marker, the percentage indicating a queue time of the transmitted IP packets. The queue time is needed by the IP packets for passing through a queue provided by the node. The queue time corresponds to a length of the queue. The IP packets to be marked are selected statistically. An explicit congestion notification, ECN, bit of an IP header of an IP packet may be used as the binary marker.

In a favorable embodiment, the distributed real-time application, after having reduced the data rate, resumes exploiting the currently available bitrate of the communication connection. The distributed real-time application may increase the data rate when the currently available bitrate increases after having dropped discontinuously. Increasing the data rate may comprise increasing a frame rate and/or a resolution of video frames.

Anticipating the currently available bitrate may comprise calculating the dropped bitrate depending on a modulation scheme of the communication connection, a radio quality of the communication connection and/or spectral resources assigned to the communication connection. The listed items are not exhaustive. Any property or context of the communication connection indicating an imminent discontinuous drop of the bitrate may be used in calculating the dropped bitrate.

Preferably, a cellular network as the communication network provides the communication connection as a wireless connection, a mobile device as a terminal device executes an application frontend as one of the sender and the receiver and an edge cloud server as an application server executes an application backend as the other one of the sender and the receiver. A base transceiver station (BTS) of the cellular network provides the mobile device, e.g., a smartphone, a table, a notepad, a vehicle and the like, with a wireless radio connection.

Another aspect of the invention is a computer program product, comprising a storage medium with a program code. The storage medium may be configured as a CD (Compact Disc), a DVD (Digital Versatile Disk), a USB (Universal Serial Bus) stick, a hard drive, a RAM (Random Access Memory) chip, a cloud storage and the like.

According to the invention, the program code causes a computing device to carry out a method according to an embodiment of the invention as a node of a communication network in cooperation with a distributed real-time application when being executed by a processor of the computing device. The computer program product enables the node to reliably provide a distributed real-time application with a low-jitter communication connection.

Still another aspect of the invention is a computer program product, comprising a storage medium with a program code.

According to the invention, the program code causes a computing device to carry out a method according to an embodiment of the invention as a sender or a receiver of a distributed real-time application in cooperation with a node of a communication network when being executed by a processor of the computing device. The computer program product enables the distributed real-time application to reliably benefit from a low-jitter communication connection.

An essential advantage of the inventive method is that the distributed real-time application is reliably provided with a low-jitter communication connection. Accordingly, a proper operation of the distributed real-time application exploiting a currently available bitrate of the communication connection is ensured even with a discontinuous drop of the available bitrate.

It shall be understood that the features described previously and to be described subsequently may be used not only in the indicated combinations but also in different combinations or on their own without leaving the scope of the present invention.

The invention is described in detail by means of an exemplary embodiment and with reference to the drawings. Like components are indicated by like reference numerals throughout the drawings.

FIG. 1 schematically shows an entity diagram of a communication network 1. The communication network 1 comprises a node 10. The node 10 may be implemented by means of a computer program product. The computer program product comprises a storage medium with a program code. The program code causes a computing device to carry out a method according to the invention described below as the node 10 of the communication network 1 in cooperation with a distributed real-time application 2 (see below) when being executed by a processor of the computing device.

The communication network 1 may further comprise an application server 11 and a backbone 12. The communication network 1 may be connected to an internet 5. The communication network 1 is configured for providing a terminal device 4 with a communication connection 3. For instance, a cellular network as the communication network 1 provides the communication connection 3 as a wireless connection.

The terminal device 4 and the application server 11 may be configured for executing a distributed real-time application 2. For instance, a mobile device as the terminal device 4 executes an application frontend of the distributed real-time application 2 as one of a sender 20 of the distributed real-time application 2 and a receiver 21 of the distributed real-time application 2. The distributed real-time application 2 defines a minimum operable data rate.

The sender 20 or the receiver 21 of the distributed real-time application 2 may be implemented by means of a computer program product. The computer program product comprises a storage medium with a program code. The program code causes a computing device to carry out a method according to the invention described below as the sender 20 or the receiver 21 of the distributed real-time application 2 in cooperation with the node 10 of the communication network 1 when being executed by a processor of the computing device.

An edge cloud server as the application server 11 may execute an application backend of the distributed real-time application as the other one of the sender 20 and the receiver 21.

The communication network 1 is operated in a method according to an embodiment of the invention as follows.

The communication network 1 provides the sender 20 of the distributed real-time application 2 and the receiver 21 of the distributed real-time application 2 with the communication connection 3.

Figure 2:
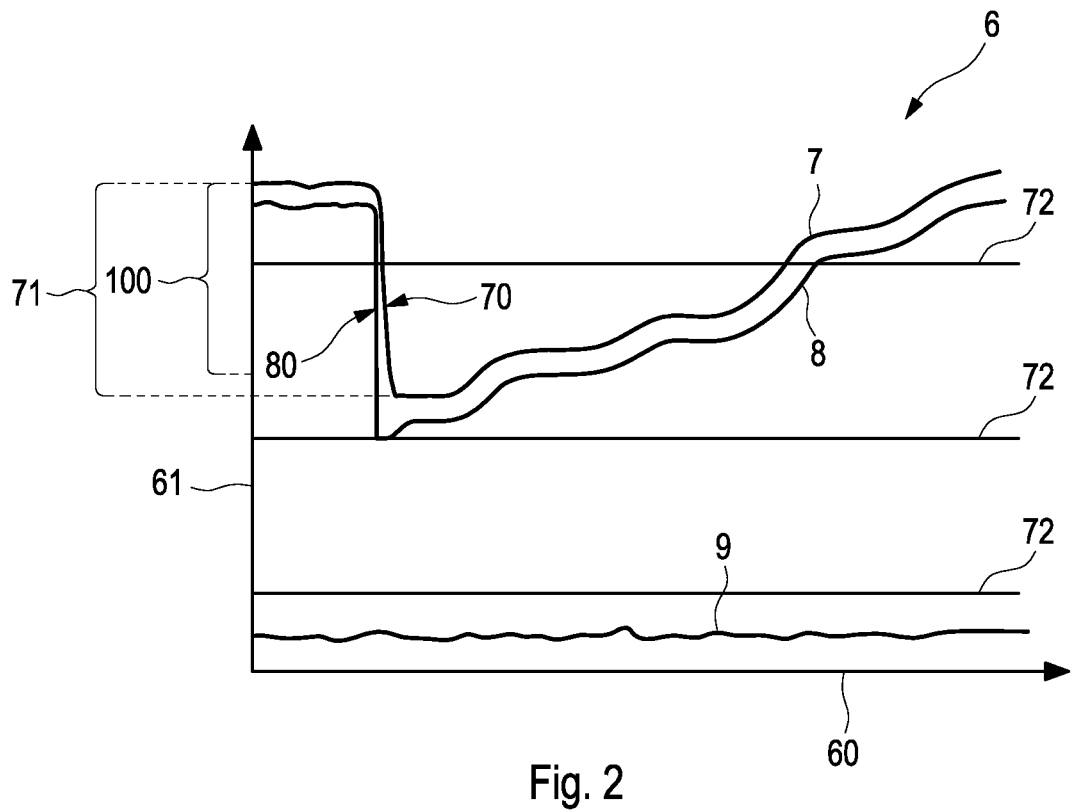
FIG. 2 schematically shows a graph of a currently available bitrate, a data rate of a distributed real-time application and a latency of a communication connection provided by the communication network shown in FIG. 1.

FIG. 2 schematically shows a graph 6 of a currently available bitrate 7, a data rate 8 of the distributed real-time application 20 and a latency 9 of the communication connection 3 provided by the communication network 1 shown in FIG. 1. The graph 6 comprises an abscissa 60 indicating a time and an ordinate 61 indicating the currently available bitrate 7 in MBit/s, the data rate 8 in MBit/s and the latency 9 in ms. Furthermore, the graph 6 shows predetermined absolute values 72 of the currently available bitrate 7.

The sender 20 periodically transmits data packets 200 to the receiver 21 via the provided communication connection 3 at the data rate 8. The data rate 8 exploits the currently available bitrate 7 of the communication connection 3. Exploiting the currently available bitrate 7 may comprise determining a maximum data rate compatible with the currently available bitrate 7 and adjusting the data rate 8 to the determined maximum data rate. Determining the maximum data rate preferably comprises repeatedly, temporarily and gradually increasing the data rate 8 on a trial basis and letting the determined maximum data rate be a data rate 8 where the measured latency 9 or a volatility of the measured latency 9 of the communication connection 3 increases.

The node 10 of the communication network 1 anticipates the currently available bitrate 7 to discontinuously drop. FIG. 2 exemplarily shows an anticipated dropping 70 of the currently available bitrate 7. Anticipating the currently available bitrate 7 may comprise calculating the dropped bitrate depending on a modulation scheme of the communication connection 3, a radio quality of the communication connection 3 and/or spectral resources assigned to the communication connection 3.

The node 10 signals a difference 71 of the dropped bitrate from the currently available bitrate 7 to the distributed real-time application 2. The difference 71 may be signaled as an absolute value, as an index indicating a predetermined absolute value 72 or as a percentage of the currently available bitrate 7.

The node 10 preferably signals the difference 71 when the difference exceeds a determined threshold value 100.

The threshold value 100 may be globally predetermined independent of the distributed real-time application 2. Alternatively, the threshold value 100 may be individually predetermined depending on the distributed real-time application 2 and assigned to the distributed real-time application 2.

The treshold value 100 may be statically predetermined by configuring the communication network 1. Alternatively, the threshold value 100 may be dynamically determined depending on a type of the distributed real-time application 2 and/or an ability of the distributed real-time application 2 in exploiting the currently available bitrate 7.

The distributed real-time application 2 immediately reduces the data rate 8 according to the signaled difference 71. FIG. 2 shows an immediate reducing 80 of the data rate 8. The distributed real-time application 2, after having reduced the data rate 8, resumes exploiting the currently available bitrate 7 of the communication connection 3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 1 communication network
10 node
100 threshold value
11 application server
12 backbone
2 distributed real-time application
20 sender
200 data packet
21 receiver
3 communication connection
4 terminal device
5 internet
6 graph
60 abscissa
61 ordinate
7 currently available bitrate
70 anticipated dropping
71 difference
72 predetermined absolute value
8 data rate
80 immediate reducing
9 latency

The invention claimed is:

1. A method for operating a communication network, comprising:
providing, by the communication network, a sender of a distributed real-time application and a receiver of the distributed real-time application with a communication connection;
periodically transmitting, by the sender, data packets to the receiver via the provided communication connection at a data rate exploiting a currently available bitrate of the communication connection;
anticipating, by a node of the communication network, a drop in available bitrate at a future point of time;
signalling, by the node of the communication network, the anticipated drop to the distributed real-time application, wherein the anticipated drop indicates a difference between the currently available bitrate and a future dropped bitrate; and
in response to the signalled anticipated drop, reducing, by the distributed real-time application, the data rate of the distributed real-time application according to the difference.

2. The method according to claim 1, wherein the node signals the difference based on determining that the difference exceeds a threshold value.

3. The method according to claim 2, wherein the threshold value is a globally predetermined threshold value which is independent of the distributed real-time application.

4. The method according to claim 2, wherein the determined threshold value is an application-specific predetermined threshold value which is based on the distributed real-time application and assigned to the distributed real-time application.

5. The method according to claim 2, wherein the threshold value is statically predetermined by configuring the communication network.

6. The method according to claim 2, wherein the threshold value is dynamically determined based on a type of the distributed real-time application and/or an ability of the distributed real-time application to utilize the currently available bitrate.

7. The method according to claim 1, wherein the difference is signalled as an absolute value, as an index indicating a predetermined absolute value, or as a percentage of the currently available bitrate.

8. The method according to claim 1, wherein exploiting the currently available bitrate comprises:
determining a maximum data rate compatible with the currently available bitrate; and
adjusting the data rate to the determined maximum data rate.

9. The method according to claim 8, wherein determining the maximum data rate comprises:
repeatedly increasing the data rate on a trial basis and designating, as the determined maximum data rate, a data rate where a measured latency of the communication connection increases or where a volatility of the measured latency of the communication connection increases.

10. The method according to claim 1, wherein the distributed real-time application, after having reduced the data rate, resumes exploiting a new currently available bitrate of the communication connection.

11. The method according to claim 1, wherein anticipating the drop comprises:
calculating the future dropped bitrate based on a modulation scheme of the communication connection, a radio quality of the communication connection, and/or spectral resources assigned to the communication connection.

12. The method according to claim 1, wherein the communication network is a cellular network;
wherein the communication connection is a wireless connection;
wherein a mobile device executes an application frontend of the distributed real-time application; and
wherein an edge cloud server executes an application backend of the distributed real-time application.

13. A system, comprising:
a communication network comprising a node; and
a sender and a receiver configured to implement a distributed real-time application;
wherein the communication network is configured to provide the sender and the receiver of the distributed real-time application with a communication connection;
wherein the sender is configured to periodically transmit data packets to the receiver via the provided communication connection at a data rate exploiting a currently available bitrate of the communication connection;

wherein the node of the communication network is configured to:

anticipate a drop in available bitrate at a future point of time; and signal the anticipated drop to the distributed real-time application, wherein the anticipated drop indicates a difference between the currently available bitrate and a future dropped bitrate; and wherein the distributed real-time application is configured to, in response to the signalled anticipated drop, reduce the data rate of the distributed real-time application according to the difference.

14. One or more non-transitory computer-readable mediums having processor-executable instructions stored thereon for operating a communication network, wherein the processor-executable instructions, when executed, facilitate:

providing, by the communication network, a sender of a distributed real-time application and a receiver of the distributed real-time application with a communication connection;

periodically transmitting, by the sender, data packets to the receiver via the provided communication connection at a data rate exploiting a currently available bitrate of the communication connection;

anticipating, by a node of the communication network, a drop in available bitrate at a future point of time;

signalling, by the node of the communication network, the anticipated drop to the distributed real-time application, wherein the anticipated drop indicates a difference between the currently available bitrate and a future dropped bitrate; and in response to the signalled anticipated drop, reducing, by the distributed real-time application, the data rate of the distributed real-time application according to the difference.

* * * * *